United States Patent
Beguin et al.

(10) Patent No.: US 6,577,787 B2
(45) Date of Patent: Jun. 10, 2003

(54) TUNING OF OPTICAL WAVEGUIDE DEVICES CONTAINING AN ORGANIC MATERIAL

(75) Inventors: Alain Marcel Jean Beguin, Sur Seine (FR); Marc Moroni, Paris (FR); Sophie Vallon, Brentigny sur Orge (FR)

(73) Assignee: Corning Incorporated, Corning, NY (US)

( * ) Notice: Subject to any disclaimer, the term of this patent is extended or adjusted under 35 U.S.C. 154(b) by 102 days.

(21) Appl. No.: 09/758,556

(22) Filed: Jan. 11, 2001

(65) Prior Publication Data
US 2003/0081876 A1 May 1, 2003

(30) Foreign Application Priority Data
Jan. 11, 2000 (EP) .......................................... 004000045

(51) Int. Cl.$^7$ ................................................. G02B 6/28
(52) U.S. Cl. ........................ 385/24; 385/129; 385/130; 385/131; 385/132
(58) Field of Search ........................... 385/14, 24, 129, 385/130, 131, 132; 359/113, 124

(56) References Cited

U.S. PATENT DOCUMENTS

| | | |
|---|---|---|
| 3,994,559 A | 11/1976 | Crow |
| 4,712,854 A | 12/1987 | Mikami et al. |
| 5,533,151 A | 7/1996 | Leonard |
| 5,647,040 A | 7/1997 | Modavis et al. |
| 5,732,171 A | 3/1998 | Michel et al. |
| 6,243,517 B1 * | 6/2001 | Deacon ........................ 385/50 |

FOREIGN PATENT DOCUMENTS

| | | |
|---|---|---|
| DE | 44 02 422 | 9/1994 |
| DE | 44 11 860 | 10/1995 |
| EP | 0 689 067 | 12/1995 |
| JP | 10-273615 | 10/1998 |

OTHER PUBLICATIONS

Pitois et al., "Low–Loss Passive Optical Waveguides Based on Photosensitive Poly(pentafluorostyrene–co–glycidyl methacrylate)," Macromolecules 1999, 32, 2903–2909.

S. Sato et al. "59–nm Trimming of Center Wavelength of ARROW–Type Vertical Coupler Filter by UV Irradiation", IEEE Photonics Technology Letters, vol. 11, No. 3, pp. 358–360, Mar. 1999.

Chen et al. "Trimming of Polymer Waveguide Y–Junction by Rapid Photobleaching for Tuning the Power Splitting Ratio", IEEE Photonics Technology Letters, vol. 9, No. 11, pp. 1499–1501, Nov. 1997.

Bosc et al. "Temperature and polarisation insensitive Bragg gratings realised on silica waveguide on silicon", Electronics Letters, vol. 33, No. 2, pp. 134–136, Jan. 16, 1997.

Murata et al. "Light–Induced Index Change in a Waveguide of a Novel Organic Quinoid Dye and its Applications to All–Optical Devices with Localized Nonlinearity", Nonlinear Optics '98: Materials, Fundamentals and Applications Topical Meeting, Aug. 1998, pp. 313–315.

Inoue et al. "Polarization Mode Converter With Polyimide Half Waveplate in Silica–Based Planar Lightwave Circuits", IEEE Photonics Technology Letters, vol. 6, No. 5, pp. 626–628, May 1994.

Y. Inoue et al. Athermal Silica–based Arrayed–waveguide Grating Multiplexer—Sep. 22, 1997—IEEE Electronic Letters—1945–1947.

Wenhua Lin et al.—Dual–Channel–Spacing Phased–Array Waveguide Grating Multi/Demultiplexers—Nov. 11, 1996—IEEE Photonics Technology Letters—vol. 8 No. 11—1501–1503.

* cited by examiner

Primary Examiner—Hung Xuan Dang
Assistant Examiner—Tuyen Tra
(74) Attorney, Agent, or Firm—James V. Suggs

(57) ABSTRACT

The present invention provides methods of tuning the optical properties, such as the channel center wavelengths, of an integrated optical waveguide device by providing a device, such as a wavelength division multiplexer or demultiplexer, which contains an organic material, and fine tuning the device by exposing the organic material to at least one incremental step of UV irradiation.

35 Claims, 3 Drawing Sheets

TUNING OF OPTICAL WAVEGUIDE DEVICES CONTAINING AN ORGANIC MATERIAL

FIELD OF THE INVENTION

The present invention is directed to methods of tuning optical properties of organic material containing integrated optical waveguide devices. More particularly, the present invention is directed to wavelength tuning of passively athermalized wavelength division multiplexer or demultiplexer devices, more particularly of phased array (phasar) devices, by exposing the organic material to radiation such as UV light. More specifically, the organic material contained in the phasars either is used as an overclad, or fills a triangular groove made in the optical path of the phasar.

BACKGROUND OF THE INVENTION

The channel center wavelengths (called hereafter channel wavelengths) of optical waveguide multiplexers and demultiplexers must be adjusted to the ITU-T wavelength grid for wavelength division multiplexer (WDM) components. In the case of phased array multiplexers and demultiplexers (phasars), in order to adjust the wavelengths to within 0.01 nm, a reproducibility of $10^{-5}$ on the effective index is required. In practice, this reproducibility is very difficult to obtain. Thus, the wavelengths are usually adjusted to the ITU-T grid by tuning the device temperature, if the device is temperature sensitive. The channel wavelengths of silica-based phasars are sensitive to temperature because of the temperature-dependent refractive index of silicate glasses. This problem is usually overcome by maintaining the device at a constant temperature (active athermalization). The channel wavelengths can, thus, be finely tuned by controlling the device temperature (1° C.=0.01 nm for silicate glass devices).

If necessary, a rough tuning can be performed before the fine tuning. It is well known to the skilled artisan that shifting the input and/or output port(s) enables shifting of the channel wavelengths, as described in, for example, Lin et al., *IEEE Photonics Technol. Lett.*, 1996, 8, 1501–1503, which is incorporated herein by reference in its entirety. For example, shifting the output ports of a phased array demultiplexer by one port results in shifting the channel wavelengths by one channel spacing. This tuning, however, is made in discrete steps and usually has to be completed by a fine tuning, for example, by tuning the device temperature as described above or, alternatively, by the method of the invention.

On the other hand, if the process reproducibility is sufficient (typically, 0.2 nm in wavelength can be expected), only a fine tuning is required. The fine tuning can be made by tuning the device temperature as described above or, alternatively, by the method of the invention.

Active athermalization requires power consumption and temperature control. Accordingly, passively athermalized devices are currently being developed. Passive athermalization suppresses the temperature sensitivity of the devices, and, thus, suppresses the possibility of finely tuning the channel wavelengths by using the temperature of the device. Thus, methods of tuning wavelengths in passively athermalized devices are desired. Accordingly, the present invention is directed to novel methods of wavelength tuning for athermalized devices, in particular for athermalized phasars.

SUMMARY OF THE INVENTION

The present invention is directed to novel methods of wavelength tuning of an athermalized wavelength division multiplexer or demultiplexer device comprising inserting a triangular groove filled with organic material in the optical path and exposing the organic material to radiation such as UV light.

The present invention is also directed to a method of wavelength tuning of an athermalized wavelength division multiplexer or demultiplexer device comprising using an organic material as an overclad and exposing the organic material to radiation such as UV light.

The accompanying drawings are included to provide a further understanding of the invention and are incorporated in and constitute a part of this specification, illustrate embodiments of the invention, and together with the description serve to explain the principles of the invention.

DETAILED DESCRIPTION OF PREFERRED EMBODIMENTS

Figure 1:
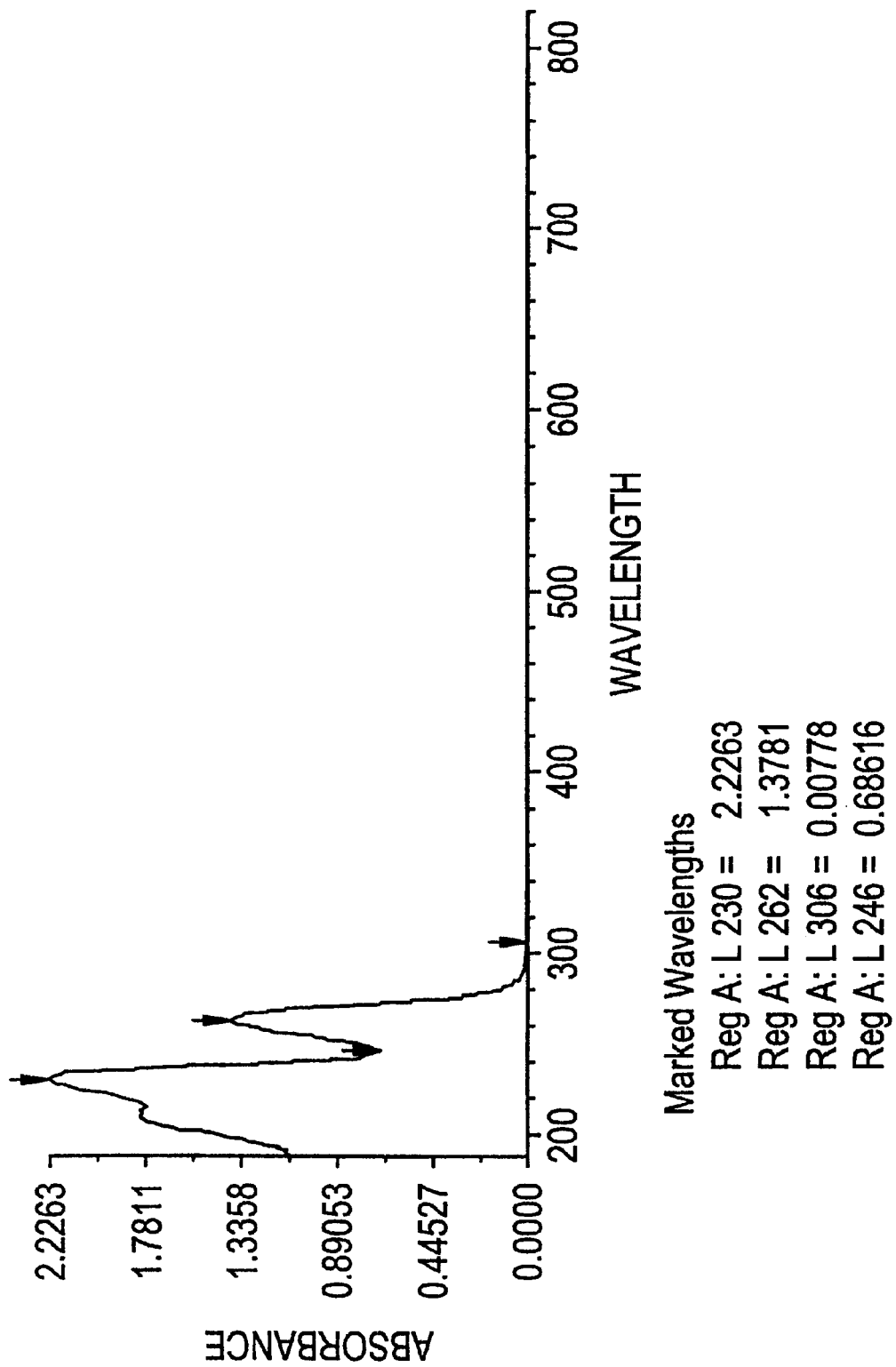
FIG. 1 shows a representative absorption spectrum of a preferred polymer.

The present invention is directed to methods of tuning optical properties of organic material containing integrated optical waveguide devices. In the present invention, the phrase "integrated optical waveguide device" refers to a device that preferably has a plurality of optical waveguide circuit core paths incorporated or integrated on a supporting, preferably a single, substrate with multiple optical waveguide paths integrated together in a single device to perform an operation or function on inputted optical wavelength signals, preferably those wavelength signals operated on or manipulated multiple wavelength signals, such as a device that has multiple inputs/outputs for combining or separating multiple wavelengths of light. The device preferably comprises a silicate glass waveguide core, such as a germanium doped silica core. In preferred embodiments of the invention, the device may comprise a Mach-Zehnder interferometer or a phased array device. The refractive index of most organic materials changes upon exposure to appropriate radiation such as UV light. More specifically, the refractive index of most organic materials can be slightly increased by exposure to suitable-wavelength radiation. The present invention uses this property of organic materials in order to finely tune the optical properties of optical waveguide devices.

More particularly, the present invention is directed to wavelength tuning of passively athermalized wavelength division multiplexer or demultiplexer devices, more particularly of phased array (phasar) devices. The present invention applies to devices athermalized by the use of an organic material (for example, polymer) with negative variation of refractive index vs. temperature (i.e., dn/dT). The present invention uses the property of organic materials to change their refractive index upon exposure to suitable-wavelength radiation, in order to finely tune the channel wavelengths of multiplexer or demultiplexer devices. First, the channel wavelengths can be roughly tuned by choosing the appropriate input and/or output ports by routine methods well known to the skilled artisan. The organic material is then exposed to appropriate radiation in small incremental steps in order to tune its index and, thus, the channel wavelengths.

In preferred embodiments of the invention, the organic material comprises a polymer. Preferred polymers include, but are not limited to, polymers and copolymers containing fluorinated monomers, preferably wherein the fluorinated monomers are selected from the vinylic, acrylic, methacrylic or allylic families (i.e., groups consisting of vinylics, acrylics, methacrylics and allylics). The copolymers containing fluorinated monomers are preferably synthesized with a free-radical process (thermally-induced or photo-induced). The polymer materials can be comprised of polymers or copolymers containing other families such as fluorodioxole. Pentafluorostyrene (5FS), trifluoroethylacrylate (3FEA), trifluoroethylmethacrylate (3FEMA), pentafluorobenzylacrylate (5FBA), pentadecafluorooctylacrylate (15FOA), hexafluoropropylacrylate (6FPA), combinations thereof, and the like are preferred fluorinated monomers of the organic polymer materials of the invention. One skilled in the art, however, is able to use other fluorinated monomers in organic polymer materials.

Preferred polymer organic materials are improved by the addition of a difunctional methacrylate-epoxy monomer, particularly when the difunctional methacrylate-epoxy monomer is glycidyl methacrylate (GMA). The difunctional methacrylate-epoxy monomer provides for cationical and/or thermal cross-linking of the copolymers after the polymer material has been casted on the device.

Preferred polymer organic materials of the invention comprise about 20–80 wt. % trifluoroethylmethacrylate, about 5–70 wt. % pentafluorostyrene, and about 0–30 wt. % glycidyl methacrylate. Alternatively, the polymer overclad comprises about 60–70 wt. % trifluoroethylmethacrylate, about 15–25 wt. % pentafluorostyrene, and about 0–20 wt. % glycidyl methacrylate. Alternatively, the polymer overclad comprises about 50–60 wt. % trifluoroethylmethacrylate, about 30–40 wt. % pentafluorostyrene, and about 0–20 wt. % glycidyl methacrylate. Alternatively, the polymer overclad comprises about 30–40 wt. % trifluoroethylmethacrylate, about 50–60 wt. % pentafluorostyrene, and about 0–20 wt. % glycidyl methacrylate.

In another embodiment of the invention, preferred polymer organic materials comprise about 0–50 wt. % pentadecafluorooctylacrylate, about 20–90 wt. % pentafluorobenzylacrylate, and about 0–30 wt. % glycidyl methacrylate. Alternatively, the polymer material comprises about 30–40 wt. % pentadecafluorooctylacrylate, about 55–65 wt. % pentafluorobenzylacrylate, and about 0–20 wt. % glycidyl methacrylate. Other preferred polymer organic materials comprise about 0–30 wt. % pentadecafluorooctylacrylate, about 20–90 wt. % pentafluorobenzylacrylate, about 0–40 wt. % hexafluoropropylacrylate, and about 0–30 wt. % glycidyl methacrylate. Alternatively, the polymer material comprises about 5–15 wt. % pentadecafluorooctylacrylate, about 65–80 wt. % pentafluorobenzylacrylate, about 5–15 wt. % hexafluoropropylacrylate, and about 0–15 wt. % glycidyl methacrylate.

In a preferred embodiment, the polymerization is run via free-radical process, using a free radical initiator. The polymerization can be run in the bulk or in solution. Preferably, the reaction is run in solution. A preferred solution for the polymerization process is comprised of tetrahydrofuran (THF). In a preferred solution, the overall monomer concentration in THF during the polymerization process is in the range 0.1–50 wt. %. Preferred free-radical initiators include, but are not limited to, peroxides and azo families. A preferred free radical is the 4,4'-azobis(4-cyanovaleric acid) (ADVN). A preferred free-radical initiator comprises about 0.1–5 wt. % ADVN regarding to the overall monomer concentration in THF.

In other preferred embodiments of the invention, the polymer material comprises a copolymer referred to herein as "Copolymer epoxy 17." Copolymer epoxy 17 is prepared by polymerizing about 35 wt. % 15FOA, about 60 wt. % 5FBA, and about 5 wt. % GMA. One wt. % of ADVN free radical initiator is added to the mixture which is dissolved in THF. The overall concentration of monomer in THF is in the range 5–50 wt. % The solution is stirred and warmed at 70° C. for 16 hours. The copolymer is isolated and purified by, for example, precipitation in methanol. As measured by the backreflectance technique, the refractive index of copolymer epoxy 17 is 1.43 at 1550 nm wavelength, 22 C, and the refractive index variation vs. temperature (dn/dT) is $-3 \times 10^{-4}$ °C.$^{-1}$ at 1550 nm in the range 22–73° C.

In other preferred embodiments of the invention, the polymer material comprises a copolymer referred to herein as "Copolymer epoxy 26." Copolymer epoxy 26 is prepared by polymerizing about 9 wt. % 15FOA, about 73 wt. % 5FBA, about 9 wt. % 6FPA, and about 9 wt. % GMA. One wt. % of ADVN free radical initiator is added to the mixture which is dissolved in THF. The overall concentration of monomer in THF is in the range 5–50 wt. %. The solution is stirred and warmed at 70° C. for 16 hours. The copolymer is isolated and purified by, for example, precipitation in methanol. The refractive index of copolymer epoxy 26 at 1550 nm, 22° C. is about 1.456 as measured by the backreflectance technique.

In other preferred embodiments of the invention, the polymer material comprises a copolymer referred to herein as "Copolymer epoxy 3." Copolymer epoxy 3 is prepared by polymerizing about 65 wt. % 3FEMA, about 20 wt. % 5FS and about 15 wt. % GMA. One wt. % of ADVN free radical initiator is added to the mixture which is dissolved in THF. The overall concentration of monomer in THF is in the range 5–50 wt. %. The copolymer is isolated and purified by, for example, precipitation in methanol. The refractive index of a copolymer epoxy 3 layer, deposited by spin-coating on a silica wafer, is 1.432 at 1550 nm wavelength, 23° C., as measured using a m-line prism coupler. The dn/dT of the copolymer epoxy 3 is $-1.2 \times 10^{-4}$ °C.$^{-1}$ at 1550 nm in the range 23–70° C., as measured by the backreflectance technique.

In another preferred embodiment of the invention, the polymer material comprises a copolymer referred to herein as "Copolymer epoxy 10." Copolymer epoxy 10 is prepared by polymerizing about 55 wt. % 3FEMA, about 35 wt. % 5FS, and about 10 wt. % GMA. One wt. % of ADVN free radical initiator is added to the mixture which is dissolved in THF. The overall concentration of monomer in THF is in the range 5–50 wt. %. The solution is stirred and warmed at 70° C. for 16 hours. The copolymer is isolated and purified by, for example, precipitation in methanol. The refractive index of a copolymer epoxy 10 layer on a silica wafer is 1.434 at 1550 nm wavelength, 23° C., as measured using a m-line prism coupler.

In another preferred embodiment of the invention, the polymer material comprises a copolymer referred to herein as "Copolymer epoxy 18." Copolymer epoxy 18 is prepared by polymerizing about 35 wt. % 3FEMA, about 55 wt. % 5FS, and about 10 wt. % GMA. One wt. % of ADVN free radical initiator is added to the mixture which is dissolved in THF. The overall concentration of monomer in THF is in the range 5–50 wt. %. The solution is stirred and warmed at 70° C. for 16 hours. The copolymer is isolated and purified by, for example, precipitation in methanol. The refractive index of a copolymer epoxy 18 layer on a silica wafer is 1.445 at 1550 nm wavelength, 23° C., as measured using a m-line prism coupler.

In some preferred embodiments of the invention, athermalization is accomplished by inserting a triangular groove filled with an organic material, such as the organic materials described above, in the optical path of the phasar. A method of forming such a groove is known to those skilled in the art. A preferred method of forming a triangular groove is recited in, for example, Inoue, et al., *Electron. Lett.*, 1997, 33, 1945–1947, which is incorporated herein by reference in its entirety. The mean channel wavelength $\lambda_m$ is then given by:

$$m \times \lambda_m = n_w \times (\Delta L - \Delta L_g) + n_g \times \Delta L_g = [(1-x) \times n_w + x \times n_g] \times \Delta L,$$

where m is the diffraction order, $n_w$ the effective index of the waveguides of the phased array, $\Delta L$ the path length difference (between adjacent waveguides) of the phased array, $\Delta L_g$ the path length difference of the groove, $n_g$ the refractive index of the organic material filling the groove, and x the ratio of $\Delta L_g$ to $\Delta L$. In order to cancel the temperature dependence of the mean channel wavelength, the geometrical parameter x is chosen to satisfy the condition $d\lambda_m/dT=0$:

$$[(1-x) \times dn_w/dT + x \times dn_g/dT] \times \Delta L + [(1-x) \times n_w + x \times n_g] \times d\Delta L/dT = 0.$$

Neglecting in first approximation the second term (proportional to the thermal expansion coefficient of the substrate) yields $$x = \frac{dn_w/dT}{-dn_g/dT + dn_w/dT}.$$

For polymers with a dn/dT of approximately $-3 \times 10^{-4}$ ° C.$^{-1}$, and for doped silica waveguides with a dn/dT of approximately $+10^{-5}$ ° C.$^{-1}$, the value of x is about 1/31. If the organic material index is varied by $\delta n_g$, for example by submitting the organic material to UV radiation, then the resulting variation in mean channel wavelength is in first approximation $$\delta\lambda_m = \lambda_m \times x \times \delta n_g/n_w.$$

If a tuning of the channel wavelength of 0.2 nm is required, the corresponding required index increase of the organic material is $5.8 \times 10^{-3}$. Accordingly, in order to obtain a precision of 0.01 nm in wavelength tuning, the index of the organic material must be controlled to $2.9 \times 10^{-4}$.

The device can also be first roughly tuned by choosing an organic material with suitable refractive index. The refractive index of the organic material can be varied, for example, by varying the fractions of the components. More specifically, the refractive index of the preferred copolymers of the invention, described above, can be varied by varying the fractions of 5FS, 3FEMA, 3FEA, GMA, 15FOA, 5FBA, and 6FPA. For example, increasing the fractions of the monomers 5FS and GMA will increase the refractive index of the copolymers of the invention, while increasing the fractions of the monomers 3FEMA, 3FEA, 15FOA and 6FPA will decrease the refractive index, as compared to a mean index value of 1.45. The refractive index of the copolymers of the invention can thus be varied by increments of, for example $10^{-3}$. In this way, the subsequent fine tuning can be reduced to a maximum index increase of $10^{-3}$. This is beneficial when an index gradient is created during the fine tuning, due to the finite penetration depth of the radiation used for tuning.

In other preferred embodiments of the invention, athermalization is accomplished by using an organic material as an overclad. The influence of the overclad index on the effective index can be calculated using a commercially available mode solver. For a 6 μm wide, 6.5 μm high waveguide with an underclad and overclad of index of about 1.444 and a 0.75% Δ, the derivative of the effective index $n_{eff}$ with respect to the overclad index $n_{overclad}$ can be estimated to 0.12. Thus, the channel wavelength variation is proportional to the overclad index variation according to the equation: $\delta\lambda_m = \lambda_m/n_{eff} \times \delta n_{eff} = \lambda_m/n_{eff} \times 0.12 \times \delta n_{overclad}$. If a tuning of the channel wavelengths of 0.2 nm is required, the corresponding required index increase of the organic material is $1.6 \times 10^{-3}$. Accordingly, in order to obtain a precision of 0.01 nm in the wavelength tuning, the index of the organic material must be controlled to $8 \times 10^{-5}$.

An 8 μm thick polymer film comprising 55 wt. % trifluoroethylmethacrylate, 35 wt. % pentafluorostyrene, and 10 wt. % glycidyl methacrylate (batch composition), was exposed to UV light (broad band non-coherent light source) for a few seconds. The refractive index was measured before and after exposure with a commercially available m-line prism coupler, and an increase of about 0.001 after exposure was found. More generally, in polymers, chemical modifications and crosslinking are both likely to induce a refractive index increase upon UV exposure. Thus, radiation of a predetermined wavelength, such as UV exposure, can be used to tune the refractive index of the polymer and thus the optical properties of the device, in particular the channel wavelengths.

In preferred embodiments of the invention, the optical waveguide device is finely tuned by exposing the organic material to UV radiation. Preferably, the device is exposed to radiation of a predetermined wavelength, such as UV irradiation, using incremental steps, which can be performed in real-time or in an off-line mode. The amount of UV exposure is readily determined by the practitioner depending upon the desired outcome. The amount of UV exposure depends, in part, upon the power output of the UV source and the length of time of exposure. After each exposure (incremental step) through the UV irradiation, the device is finely tuned. The practitioner can adjust the power output of the UV source, length of time of exposure, and the number of exposures until the desired tuning is achieved. The organic material may be exposed to a plurality of exposures to radiation of predetermined wavelength.

The invention is further illustrated by way of the following examples which is intended to elucidate the invention. This example is not intended, nor is it to be construed, as limiting the scope of the disclosure.

An exemplary method of wavelength tuning of an athermalized device having a polymer overclad is now described. First, the UV-induced index change of the polymer used in this example was measured for calibration purposes. Planar polymer layers of the copolymer epoxy 10 described above were deposited on silica substrates by spin-coating. The polymer composition was 55 wt. % trifluoroethylmethacrylate, 35 wt. % pentafluorostyrene, and 10 wt. % glycidyl methacrylate. The polymer was deposited by spin-coating from a solution (35 wt. % polymer, 65 wt. % ethyl acetate), although any known technique can be used.

The polymer layers were exposed to UV radiation using a commercial UV lamp with a maximum emission between 240 and 320 nm ("H lamp"). The lamp power was 190 W.cm$^{-1}$ (power density×irradiated area length) and the conveyer speed was 1.5 cm.s$^{-1}$, providing an energy density per pass of 127 J.cm$^{-2}$. The absorption of the polymer (optical density) is shown in FIG. 1. The absorption band at 260 nm is located in the emission spectrum of the lamp, enabling photo-induced changes in the polymer.

Figure 2:
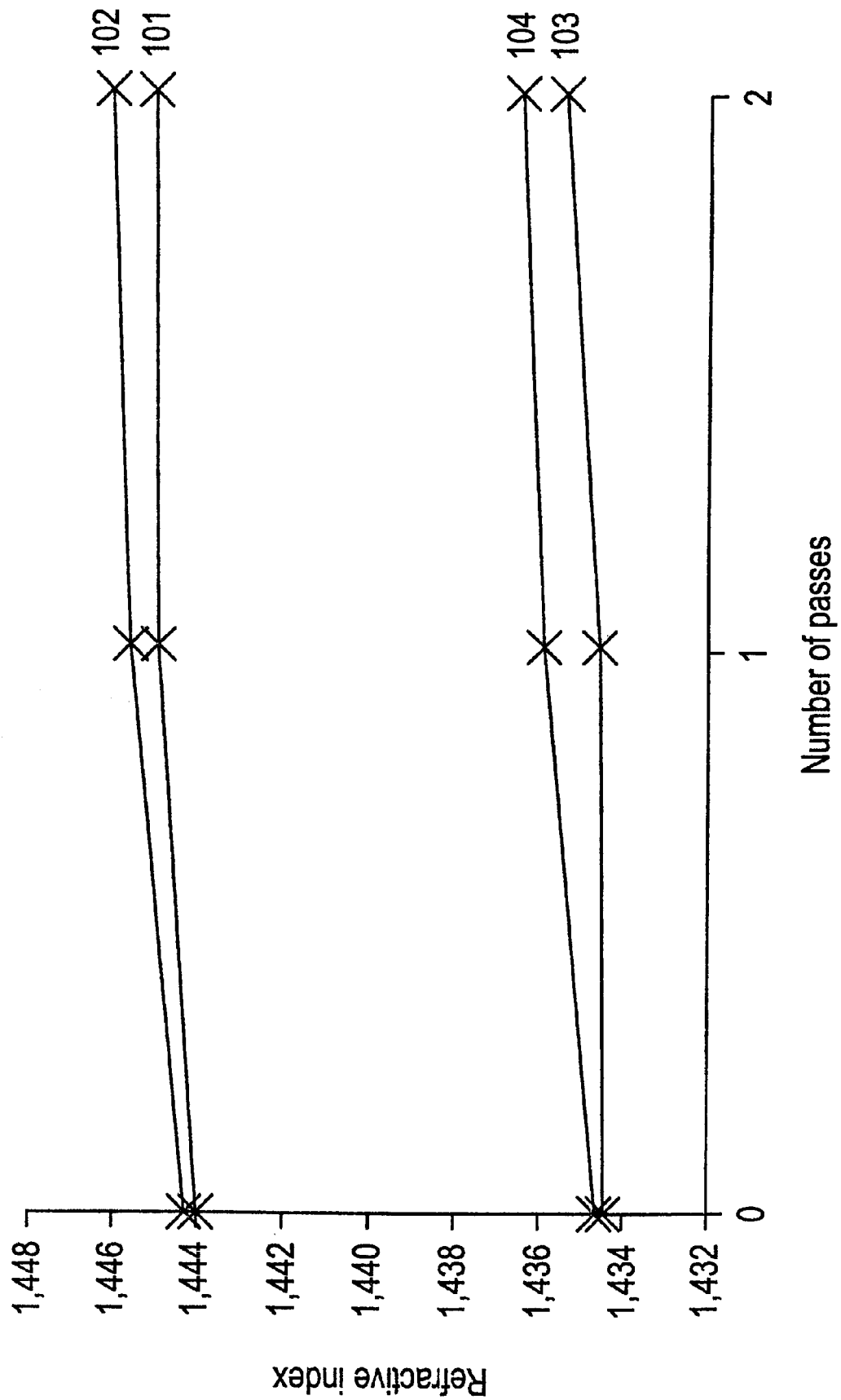
FIG. 2 shows a representative graph of refractive index at two different wavelengths of two samples of a preferred polymer versus the number of passes under a UV lamp.

The refractive index of the polymer was measured before and after UV exposure using a m-line prism coupler. FIG. 2 shows the refractive index of the polymer layers at 633 nm (101: sample #1; 102: sample #2) and at 1550 nm (103: sample #1: 104; sample #2) versus the number of passes under the UV lamp. Sample #1 was exposed from the silica substrate side, while sample #2 was exposed from the polymer side. The different index variation from the two samples is most likely due to a refractive index gradient induced by the exponential decay of UV light in the layer during irradiation, and to absorption by the silica substrate for sample #1. For inhomogeneous layers, the m-line prism coupler only measures an effective index that depends on the index gradient. The order of magnitude of the refractive index increase after 2 passes is 10$^{-3}$ and can be higher near the surface.

Given this calibration, the method of wavelength tuning of an athermalized polymer overcladded phased array demultiplexer is now described. A phased array demultiplexer consisting of a silica substrate, a doped silica waveguide circuit core and a polymer overclad was prepared using standard techniques well known to the skilled artisan. A commercial core layer supported on a silica substrate was used. The nominal core layer composition was (in wt. %): GeO$_2$ 13.9, P$_2$O$_5$ 1.4, B$_2$O$_3$ 3.4, and SiO$_2$ 81.3. The refractive index of the core layer, measured with the m-line prism coupler, was 1.453 at 1550 nm, and the core layer thickness was 6.8 μm. The waveguide circuit was patterned by photolithography and reactive ion etching, using a phased array demultiplexer design with a 100 GHz channel spacing. The waveguide width was 6.3 μm. The device was then overcladded with the same polymer as described above.

Figure 3:
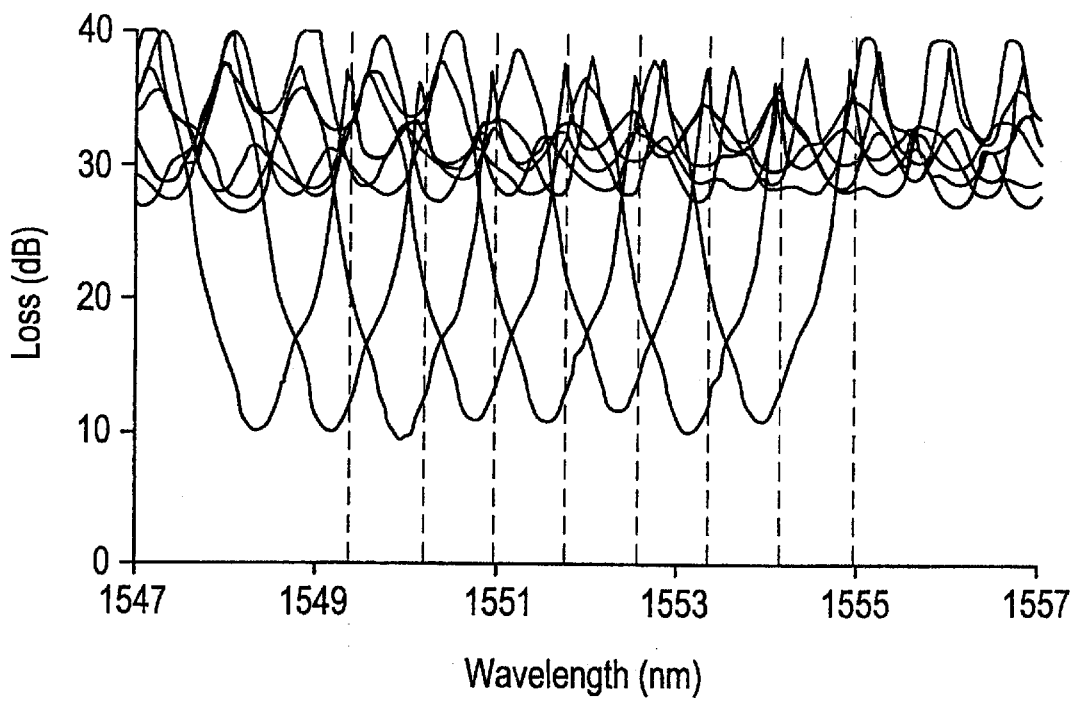
FIG. 3 shows representative transmission spectra (loss vs. wavelength) of 8 optical channels (output waveguides #5 to 12) of a preferred phased array device with the ITU grid wavelengths indicated by vertical dashed lines.

FIG. 3 shows the transmission spectra (loss vs. wavelength) of 8 optical channels (output waveguides #5 to 12) of the phased array device with the ITU grid wavelengths (see Table 1) indicated by the vertical dashed lines. The difference between the mean channel wavelength of the phased array device and the mean ITU grid wavelength was −1.02 nm. A step of 0.8 nm could be gained by shifting the channels by one output waveguide, such as by using the output waveguides #6 to 13 rather than #5 to 12. There remained a −0.22 nm wavelength difference to be compensated by UV irradiation.

TABLE 1

| Channel | Wavelength (nm) |
|---------|----------------|
| 1 | 1549.315 |
| 2 | 1550.116 |
| 3 | 1550.918 |
| 4 | 1551.721 |
| 5 | 1552.524 |
| 6 | 1553.329 |

TABLE 1-continued

| Channel | Wavelength (nm) |
|---------|----------------|
| 7 | 1554.134 |
| 8 | 1554.940 |

The phased array device was exposed to UV irradiation from the substrate side, in order to obtain a faster compensation, and also a better confinement of light in the waveguide after UV exposure. Such procedure can be used for planar substrates that are transparent to radiation. However, in the case of substrates which are not transparent to the particular light wavelength that is suitable for irradiation (such as silicon substrates), the exposure can be made from the polymer side provided the penetration depth is not too small as compared to the total polymer thickness. The phased array device was exposed to 2 passes under the UV lamp, under the same conditions as described above.

Figure 4:
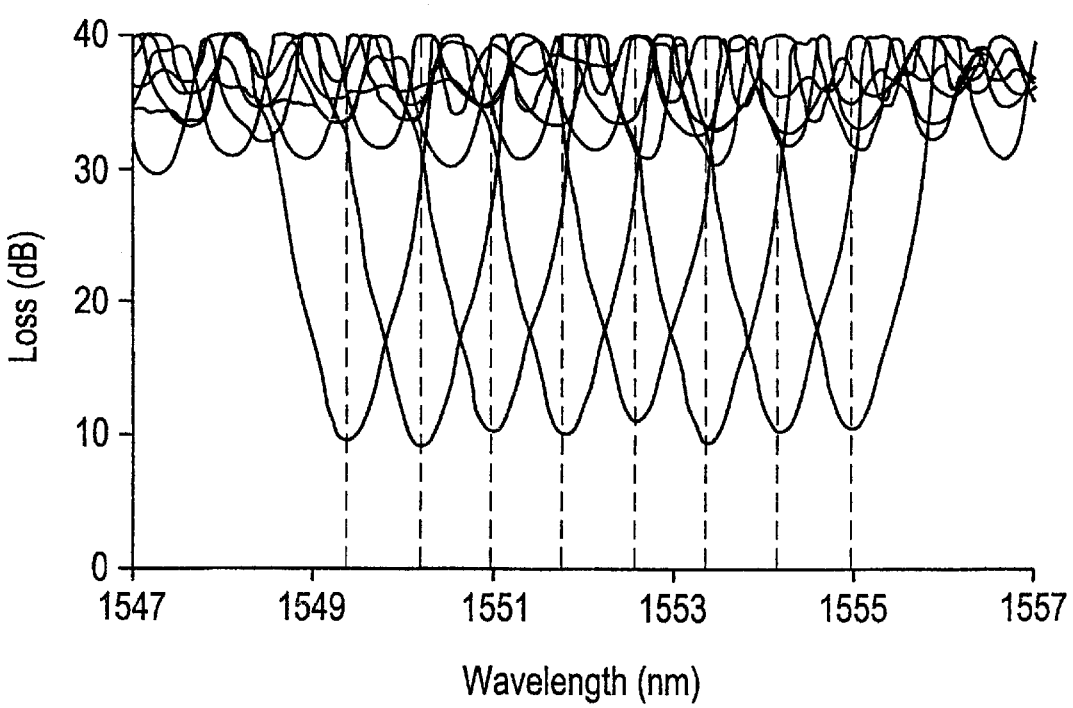
FIG. 4 shows the representative transmission spectra of the 8 optical channels (output waveguides #6 to 13) after UV exposure, with the ITU grid wavelengths indicated by vertical dashed lines.

FIG. 4 shows the transmission spectra of the 8 optical channels (output waveguides #6 to 13) after UV exposure, with the ITU grid wavelengths indicated by vertical dashed lines. After UV exposure, the difference between the mean channel wavelength of the phased array device and the mean ITU grid wavelength had reduced to +0.03 nm.

Although the device had been slightly overexposed because of an inaccurate estimation of the required exposure time, these results confirm that UV irradiation can be used to tune the channel wavelengths of a polymer overcladded phased array device. By reducing the lamp power to 25% and increasing the conveyer speed to 5 cm.s$^{-1}$, a precision of ±0.005 nm can be achieved. In addition, the minimum insertion loss and the cross-talk of the device were not degraded by UV exposure, as can be seen from FIGS. 3 and 4.

It will be apparent to those skilled in the art that various modifications and variations can be made in the methods of the present invention without departing from the spirit or scope of the invention. Thus, it is intended that the present invention covers the modifications and variations of this invention provided they come within the scope of the appended claims and their equivalents.

What is claimed is:

1. A method of wavelength tuning an athermalized optical waveguide wavelength division multiplexer or demultiplexer device comprising the steps:

a) providing said athermalized multiplexer or demultiplexer device with an organic material, the center wavelengths of the optical channels of said device being dependent on the refractive index of said organic material, and said refractive index of said organic material being sensitive to radiations of predetermined wavelength;

b) tuning said channel center wavelengths of said multiplexer or demultiplexer device by exposing said organic material to said radiations of predetermined wavelength.

2. The method of claim 1 wherein the athermalized optical waveguide wavelength division multiplexer or demultiplexer device is a phased array wavelength division multiplexer or demultiplexer.

3. The method of claim 1 or 2 wherein prior to step b), the channel wavelengths of said device are tuned by choosing appropriate input and output ports.

4. The method of claim 2 wherein step b) is performed by exposing said organic material to radiation of predetermined wavelength in incremental steps.

5. The method of claim 4 wherein said step of tuning said device by exposing said organic material to radiation of predetermined wavelength in incremental steps comprises exposing said organic material to a plurality of exposures to radiation of predetermined wavelength.

6. The method of claim 4 wherein said step of tuning said device by exposing said organic material to radiation of predetermined wavelength in incremental steps comprises exposing said power of the radiation of predetermined wavelength.

7. The method of claim 1 or 2 wherein said organic material is a polymer or copolymer of at least one fluorinated monomer, said fluorinated monomer being selected from the group consisting of pentafluorostyrene, trifluoroethylacrylate, trifluoroethylmethacrylate, pentafluorobenzylacrylate, pentadecafluorooctylacrylate, hexafluoropropylacrylate, and glycidyl methacrylate.

8. The method of claim 2 wherein said step of providing said athermalized waveguide device with said organic material comprises overcladding said device with an organic containing material.

9. The method of claim 8 wherein the refractive index of said organic material is controlled with a precision of at least $8 \times 10^{-5}$.

10. The method of claim 1 or 2 wherein said step of providing said optical waveguide device with said organic material comprises overcladding said device with a polymer overclad.

11. The method of claim 10 wherein said polymer overclad is formed from a copolymer of monomers including trifluoroethylmethacrylate and pentafluorostyrene.

12. The method of claim 10 wherein said polymer overclad is formed from a copolymer of monomers including comprises glycidyl methacrylate.

13. The method of claim 10 wherein said polymer overclad is formed from a copolymer of monomers including glycidyl methacrylate, trifluoroethylmethacrylate and pentafluorostyrene.

14. The method of claim 10 wherein said polymer overclad is a copolymer of a mixture of monomers including about 20–80 wt. % trifluoroethylmethacrylate, about 5–70 wt. % pentafluorostyrene, and about 0–30 wt. % glycidyl methacrylate.

15. The method of claim 10 wherein said polymer overclad is a copolymer of a mixture of monomers including about 60–70 wt. % trifluoroethylmethacrylate, about 15–25 wt. % pentafluorostyrene, and about 0–20 wt. % glycidyl methacrylate.

16. The method of claim 10 wherein said polymer overclad is a copolymer of a mixture of monomers including about 50–60 wt. % trifluoroethylmethacrylate, about 30–40 wt. % pentafluorostyrene, and about 0–20 wt. % glycidyl methacrylate.

17. The method of claim 10 wherein said polymer overclad is a copolymer of a mixture of monomers including about 30–40 wt. % trifluoroethylmethacrylate, about 50–60 wt. % pentafluorostyrene, and about 0–20 wt. % glycidyl methacrylate.

18. The method of claim 1 or 2 wherein said step of providing said optical waveguide device with said organic material comprises disposing said organic material in a groove made in the optical path of said device.

19. The method of claim 18 where said organic material is chosen to minimize subsequent exposure to radiation of predetermined wavelength.

20. The method of claim 18 wherein said organic material is a copolymer of a mixture of monomers including pentafluorobenzylacrylate and pentadecafluorooctylacrylate.

21. The method of claim 20 wherein said mixture of monomers further comprises glycidyl methacrylate.

22. The method of claim 20 wherein said mixture of monomers comprises about 30–40 wt. % pentadecafluorooctylacrylate, about 55–65 wt. % pentafluorobenzylacrylate, and about 0–20 wt. % glycidyl methacrylate.

23. The method of claim 18 wherein said organic material is a polymer or copolymer of a mixture of monomers including about 0–50 wt. % pentadecafluorooctylacrylate, about 20–90 wt. % pentafluorobenzylacrylate, and about 0–30 wt. % glycidyl methacrylate.

24. The method of claim 18 wherein said organic material is a polymer or copolymer of a mixture of monomers including about 0–30 wt. % pentadecafluorooctylacrylate, about 20–90 wt. % pentafluorobenzylacrylate, about 0–40 wt. % hexafluoropropylacrylate, and about 0–30 wt. % glycidyl methacrylate.

25. The method of claim 18 wherein said organic material is a polymer or copolymer of a mixture of monomers including about 5–15 wt. % pentadecafluorooctylacrylate, about 65–80 wt. % pentafluorobenzylacrylate, about 5–15 wt. % hexafluoropropylacrylate, and about 0–15 wt. % glycidyl methacrylate.

26. The method of claim 18 wherein the refractive index of said organic material is controlled with a precision of at least $2.9 \times 10^{-4}$.

27. The method of claim 2 wherein said device comprises a silicate glass waveguide core.

28. The method of claim 27 wherein said waveguide core is a germanium doped silica core.

29. The method of claim 2 wherein said device comprises a planar substrate that is transparent to the radiation of predetermined wavelength.

30. The method of claim 29 wherein said substrate is a silica substrate.

31. The method of claim 29 wherein said step of tuning said device by exposing said organic material to radiation of predetermined wavelength comprises exposing said device from the substrate side in incremental steps to a plurality of exposures to radiation of predetermined wavelength.

32. The method of claim 1 or 2 wherein said device has a temperature induced channel wavelength shift of less than 0.1 nm in an operating temperature range of 0–70° C.

33. The method of claim 1 or 2 wherein said tuning is with a precision of at least ±0.005 nm.

34. The method of claim 1 wherein said device comprises a Mach-Zehnder interferometer.

35. A method of wavelength tuning an athermalized optical waveguide wavelength division multiplexer or demultiplexer device comprising the steps:

a) providing said athermalized multiplexer or demultiplexer device with an organic material, the center wavelengths of the optical channels of said device being dependent on the refractive index of said organic material, and said refractive index of said organic material being sensitive to UV radiations that include at least one of the absorption wavelengths of the organic material;

b) tuning said channel center wavelengths of said multiplexer or demultiplexer device by exposing said organic material to said UV radiations.

* * * * *